United States Patent [19]

Carlson et al.

[11] Patent Number: 5,210,793
[45] Date of Patent: May 11, 1993

[54] APPARATUS FOR MOUNTING TRANSDUCERS

[75] Inventors: Kenneth W. Carlson, Hawthorn Woods; John C. Laugal, Hoffman Estates; Kenneth R. Haddad, Arlington Heights, all of Ill.

[73] Assignee: Motorola, Inc., Schaumburg, Ill.

[21] Appl. No.: 610,186

[22] Filed: Nov. 7, 1990

[51] Int. Cl.⁵ .................. H04M 1/00; H04R 25/00
[52] U.S. Cl. .......................... 379/433; 379/428; 379/429; 379/440; 381/169
[58] Field of Search ............... 379/429, 428, 431, 432, 379/433, 440, 457, 420, 437; 381/169, 205, 189

[56] References Cited

U.S. PATENT DOCUMENTS

| 4,550,429 | 10/1985 | Burbank et al. | 379/420 |
| 4,817,164 | 3/1989 | Bertignoll et al. | 381/189 |
| 4,885,773 | 12/1989 | Stottlemyer et al. | 381/169 |

FOREIGN PATENT DOCUMENTS

| 0126355 | 7/1984 | Japan | 379/420 |
| 0149951 | 6/1988 | Japan | 379/429 |
| 0021760 | 1/1990 | Japan | 379/433 |

OTHER PUBLICATIONS

Motorola Service Manual 68P81054E60-0, pp. 68P810587E87-0 shows an exploded view of a Motorola Portable Cellular Radio Telephone Model No. 9500XL. A receptable part No. 75D83456R01 is used to mount a noise cancelling microphone transducer. A second receptacle, part No. 32-82863P01 is used to mount a ringer alert transducer.
Motorola, Inc., Dyna TAC Portable Mechanical Parts, CPL-0012-0, 68P81057E87-0, Jul. 30, 1988-PHI.

Primary Examiner—James L. Dwyer
Assistant Examiner—Jason Chan
Attorney, Agent, or Firm—Kevin D. Kaschke; Raymond A. Jenski; John Fisher

[57] ABSTRACT

A wedge-shaped receptacle for mounting a noise cancelling microphone transducer (105) and a ringer alert transducer (107) within a housing (101) is disclosed. The receptacle (111) is molded from a flexible material providing efficient assembly of the transducers within two apertures in the receptacle (129 and 133). Gaskets (137 and 145), molded as part of the receptacle, provide an acoustic and weatherproof seal between the receptacle (111) and the housing (101) for each transducer. The two apertures (129 and 133), providing acoustic interface for the ringer alert transducer (107) and the microphone transducer (105), share the same opening (113) in the front face of the housing (101). The aperture (133) for the noise cancelling microphone (105) is also open to a second opening (115) in the bottom face of the housing (101) to cancel background noise. The receptacle includes channels (201 and 202) which allow back pressure release for the ringer alert transducer (107). The receptacle (111) also dresses the microphone wires (141) through another aperture (131) to prevent damage during the assembly of the receptacle (111) into the housing (101).

11 Claims, 2 Drawing Sheets

APPARATUS FOR MOUNTING TRANSDUCERS

FIELD OF THE INVENTION

The present invention relates generally to apparatus for mounting transducers, and, more particularly, to a flexible apparatus for mounting both a noise cancelling microphone transducer and a ringer alert transducer within a housing.

BACKGROUND OF THE INVENTION

Mounting systems are generally required for positioning a transducer within a housing. The mounting system positions the transducer near an opening in the housing to permit acoustic interface between the transducer and free space outside the housing. Optimum acoustic performance usually requires an acoustic seal between the mounting system and an area surrounding the opening in the housing. The acoustic seal prevents sound pressure to or from the transducer from leaking inside the housing thus degrading acoustic performance.

Optimum acoustic performance may also require that a resonant cavity be incorporated into the mounting system. The resonant cavity is a volume of space within the mounting system positioned between the transducer and the housing.

Some transducer applications require a weatherproof seal between the mounting system and the area surrounding the opening in housing to prevent weather elements from dispersing throughout the housing.

Mounting systems frequently are receptacles molded from flexible rubber. The receptacle is molded to comply with the design criteria for mechanical, acoustical and environmental performance.

Two such flexible receptacles are found in a portable cellular radio telephone (Model No. 9500XL). The application of the flexible receptacles within the radio telephone is described in Motorola Service Manual 68P81054E60-0, Part No. 68P81057E87-0. The first receptacle (Part No. 75D83456R01) is used to mount a noise cancelling microphone transducer. The second flexible receptacle (Part No. 32-82863P01) is used to mount a ringer alert transducer.

The noise cancelling microphone and ringer alert transducers each have their own independent flexible mounting receptacle. The transducers are located at opposite ends of the radio telephone. Each transducer has flexible, insulated lead wires with a connector. Each transducer is coupled to its own opening in the radio telephone's housing enabling acoustic interface to free space outside the housing. Both flexible mounting receptacles provide an acoustic and weatherproof seal.

Characteristics unique to the flexible mounting receptacle for the noise cancelling microphone transducer include: balanced chambers, an interference fit assembly design and an opening requiring silicone fill. Balanced chambers optimize the performance of the noise cancelling microphone transducer. The noise cancelling microphone detects a sound pressure level signal with both sides of its diaphragm. The signal reaches the back side of the diaphragm via holes in the back side of the microphone. The microphone will cancel the signal if the sound pressure level on both sides of the diaphragm are equal. The sound pressure level on the diaphragm is primarily determined by the distance between the source of the sound and the diaphragm. A sound pressure level signal from a far distance, such as noise, has the same pressure level on both sides of the diaphragm and thus is cancelled. A sound pressure level signal from a close distance, such as a voice signal, has a greater pressure level on the front of the diaphragm than on the back of the diaphragm thus very little of the voice signal is cancelled out. The net effect of the noise cancelling microphone is that background noise is cancelled out of the input voice signal. A noise cancelling microphone requires that the volume of the chambers on each side of the microphone transducer be equal in order to optimize its noise cancelling operation.

The microphone's receptacle is assembled into the housing using an interference fit. In addition to providing mechanical fixturing, the interference fit provides both an acoustic and weatherproof seal between the receptacle and the radio telephone's housing. Problems with the interference fit design include slow assembly time and the lack of a positive locating feature.

Silicone or similar material is typically needed to seal the opening where the flexible lead wires exit the receptacle to maintain weatherproof seal. The application of the silicone is time consuming and messy and can lead to degraded quality.

Characteristics unique to the ringer alert transducer include a resonant cavity, back pressure release and a compression fit. The resonant cavity is often molded as part of the plastic housing of the ringer alert transducer. The volume of space inside the resonant cavity is chosen to optimize the sound pressure level output of the ringer alert.

The back side of the ringer alert is open to the inside of the radio telephone housing, thus providing back pressure release. Ringer alert transducers require a volume of space behind the transducer's diaphragm to release air pressure when the diaphragm inside the ringer alert transducer deflects to produce a sound pressure level signal in front of the diaphragm.

The ringer alert is assembled within the aforementioned radio telephone using a bracket held by two screws and a flexible molded receptacle. The bracket positions the ringer alert and compresses the flexible molded receptacle between the ringer alert transducer and the housing to provide an acoustic and weatherproof seal.

Although the transducer mounting systems, as described above, meet the general requirements of the application, improved cost, quality, and assembly advantages may be realized using a new mounting system as described below.

SUMMARY OF THE INVENTION

An apparatus provides the mounting for a first and a second transducer in electronic equipment having a housing. The apparatus comprises a flexible wedge-shaped receptacle including a first, second and third surface. The third surface is disposed at an acute angle to the first surface. The second surface is disposed between the first and third surfaces. A first aperture extends from the first surface, through the receptacle, to the third surface to hold the first transducer. A second aperture extending from the second surface, through the receptacle, to the third surface to hold the second transducer.

DETAILED DESCRIPTION OF A PREFERRED EMBODIMENT

Figure 1:
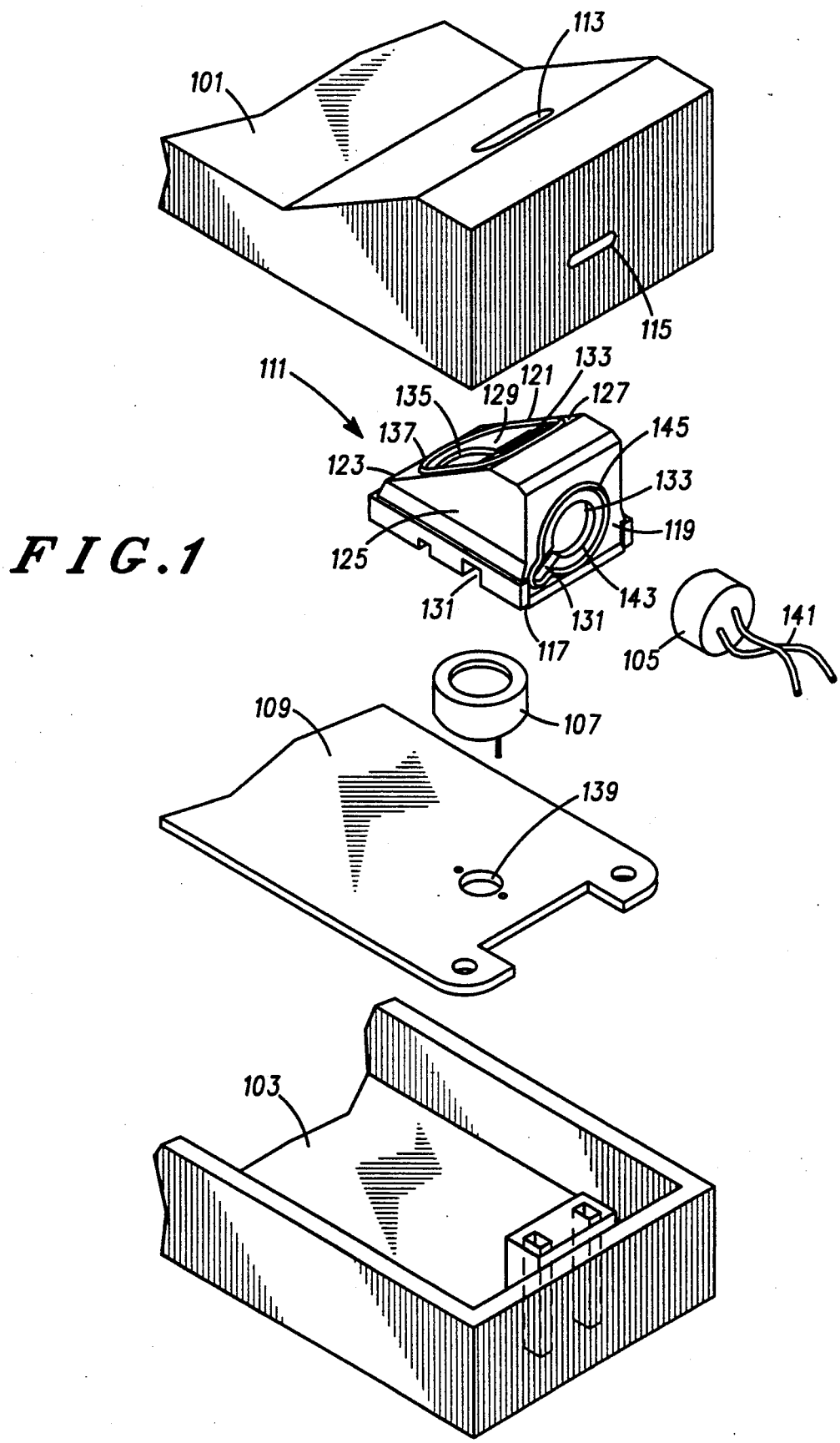
FIG. 1 is an exploded view of a portion of a radio telephone showing a first perspective view of the preferred embodiment of the present invention.

FIG. 1 shows an exploded view of a radio telephone employing a first perspective view of the preferred embodiment of the present invention. The radio telephone parts shown in FIG. 1 include a front housing 101, a back housing 103, a noise cancelling microphone transducer 105, a ringer alert transducer 107, a printed circuit board (pcb) 109 and a flexible wedge-shaped mounting receptacle 111.

A feature of the preferred embodiment of the present invention is to mount both the microphone 105 and the ringer alert 107 transducers within the same receptacle 111. Two apertures within the receptacle 111 captivate the noise cancelling microphone 105 and ringer alert 107 transducers.

Other features of the preferred embodiment of the present invention include a molded resonant cavity and a compression fit assembly. The receptacle 111 includes an appropriate resonant cavity for the ringer alert transducer and an appropriate balanced chambers for the noise cancelling microphone 105. After captivating the transducers, the receptacle is compressed between the front housing 101 and the pcb 109 such that the ringer alert transducer's resonant cavity is coupled to a rounded aperture 113 in the face of the front housing 101 and the balanced chambers for the microphone transducer 105 are coupled to the housing front face aperture 113 and a aperture 115 in the bottom of front housing 101. The compression fit provides an acoustic and weatherproof seal between the receptacle 111 and free space outside the radio telephone's housing.

Many cost and assembly advantages are realized over prior transducer mounting systems by employing the preferred embodiment of the present invention. Parts eliminated from the prior design include: lead wire connectors for the microphone and ringer alert transducers 105 and 107, silicone for the microphone receptacle and the bracket, lead wires and molded resonant cavity for the ringer alert transducer. The receptacle 111 design allows blind assembly techniques to be used without encouraging defects. The compression fit of the receptacle 111 between the PCB 109 and the front housing 101 enables fast assembly.

The receptacle is molded from a rubber material such as neoprene. After the material has cured, the receptacle retains its flexible characteristics. The receptacle 111, as shown in FIG. 1, generally includes six surfaces: a rectangular bottom surface 117, a square side surface 119, a triangular-like side surface 121, a rectangular side surface 123, a triangular-like side surface 125, and a rectangular top surface 127.

The rectangular top surface 127 (19×17 mm) is positioned at an acute angle 31 degrees in the preferred embodiment with respect to the rectangular bottom surface 117 (20×25 mm). The square side surface 119 (18×18 mm) is essentially opposite and parallel to the rectangular side surface 123. The triangular-like side surface 121 is essentially opposite and parallel to the triangular-like side surface 125. Each surface is joined with its adjacent surfaces to form edges.

The receptacle 111 includes three apertures. A first aperture 129 (12 mm dia.) is disposed between the rectangular bottom surface 117 and the rectangular top surface 127. A second aperture 131 (2.3 mm dia.) is disposed between the square side surface 119 and the edge of the rectangular bottom surface 117 and the triangular-like side surface 125. The third aperture 133 (9.7 mm dia. under the ledge 143 under the square surface 119) is disposed between the square side surface 119 and the rectangular top surface 127.

The ringer alert transducer 107 is positioned within the first aperture 129 so that the acoustic output of the ringer alert transducer 107 is directed toward the rectangular top surface 127 of the receptacle 111. A feature of the preferred embodiment of the present invention is that a first gasket 135 is molded on the inside surface of the first aperture 129. The first gasket 135 compresses to encompass the ringer alert transducer 107 during assembly to provide an acoustic and weatherproof seal.

After the ringer alert transducer 107 is positioned, the volume of space above the ringer alert transducer 107 within the first aperture 129 comprises the ringer alert transducer's resonant cavity. The dimensions of the resonant cavity are optimized for the chosen ringer alert transducer 107 to allow maximum sound pressure level output.

The ringer alert transducer's 107 sound pressure level output to free space outside the radio telephone is through the housing front face aperture 113 in the front housing 101.

A feature of the preferred embodiment of the present invention is a second gasket 137 molded to encompass the first aperture 129 and the third aperture 133 in the rectangular top surface 127. The second gasket 137, after being compressed against the front housing 101 by the PCB 109, provides an acoustic and weatherproof seal between the receptacle 111 and free space outside of the radio telephone through the housing front face aperture 113 in the front housing 101.

Back pressure release for the ringer alert 107 is provided by an aperture 139 in the printed circuit board 109 directly behind the ringer alert transducer 107 and two channels molded into the rectangular bottom surface of the receptacle 117. The two channels will be described in more detail in association with FIG. 2.

The noise canceling microphone transducer 105 is positioned within the third aperture 133 so that the flexible leads 141 of the microphone transducer 105 face the square side surface 119 of the receptacle 111. A feature of the preferred embodiment of the present invention is a ledge 143 which comprises a portion of the square side surface 119 of the receptacle 111 extending over the third aperture 133. The ledge 143 captivates and seals the microphone transducer 105 within the third aperture 133. The volume of space between the terminal side of the microphone transducer 105 and the bottom aperture 115 in the front housing 101 defines one of the two balanced chambers required for the noise cancelling microphone transducer 105.

A feature of the preferred embodiment of the present invention is a third gasket 145 molded on the square side surface of the receptacle 119. After the receptacle 111 is compressed against the front housing 101, the third gasket 145 provides an acoustic and weatherproof seal between the receptacle 111 and free space outside of the radio telephone's housing through the bottom aperture 115 in the front housing 101.

The primary sound pressure level input for the microphone transducer 105 is through the third aperture 133 open to the rectangular top surface 127 of the receptacle 111. The space between the noise cancelling microphone transducer 105 and the opening of the third aperture 133 open to the rectangular top surface 127 comprises another balanced chamber. The third aperture 133 of the receptacle 111 is aligned with the housing front face aperture 113 in the front housing 101 after the receptacle 111 is assembled into the radio telephone. As previously mentioned, the second gasket 137 encompasses the first and third aperture 129 and 133 on the rectangular top surface 127 of the receptacle 111 thus providing an acoustic and weatherproof seal between the microphone 105 and free space outside of the radio telephone through the housing front face aperture 113 of the front housing 101 after the receptacle 111 is assembled into the radio telephone.

It is a feature of the preferred embodiment of the present invention that the sound pressure level output of the ringer alert transducer 107 and the sound input pressure level for the microphone transducer 105 both share the housing front face aperture 113 in the front housing 101.

Figure 2:
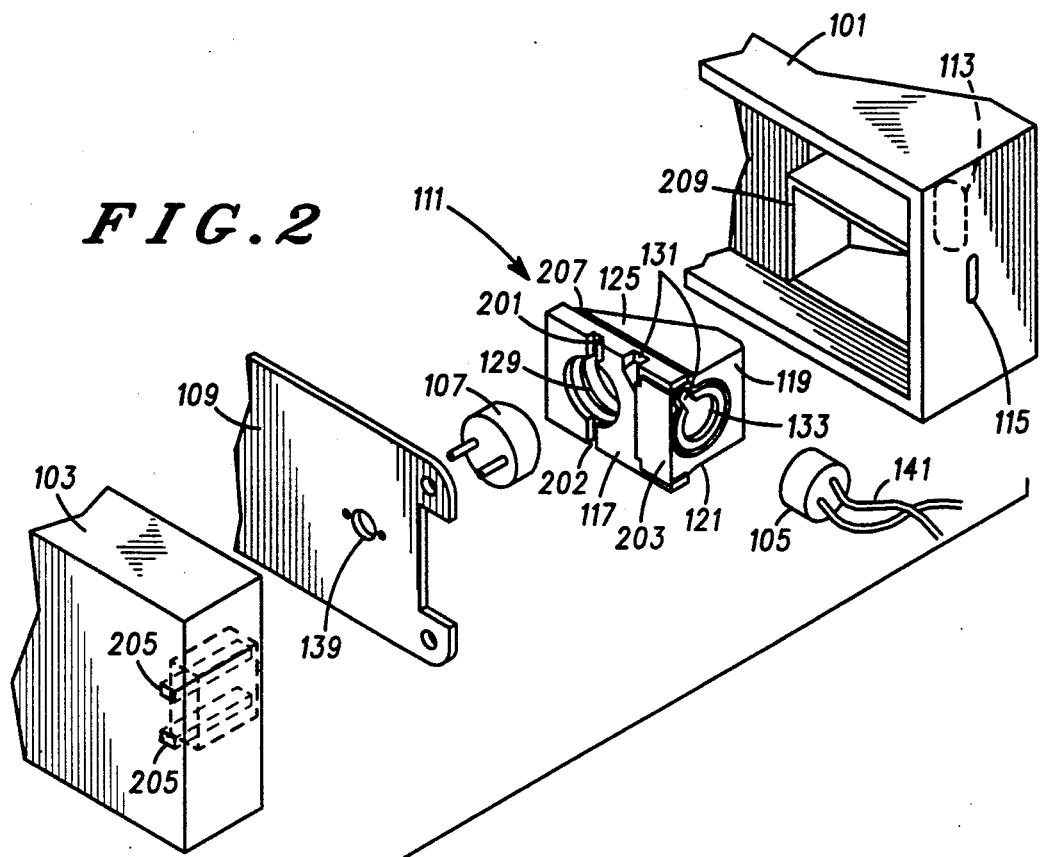
FIG. 2 is an exploded view of a portion of a radio telephone showing a second perspective view of the preferred embodiment of the present invention.

Now referring to FIG. 2 there is shown an exploded view of the radio telephone showing a second perspective view of the preferred embodiment of the present invention. This perspective allows us to view details of the bottom surface of the receptacle 117 not shown in FIG. 1.

Two channels 201 and 202 are included in the bottom surface 117 of the receptacle 111. A channel 201 allows air to flow between the aperture 129 and the triangular-like side surface 125 of the receptacle 111. Likewise, another second channel 202 allows air to flow between the aperture 129 and the rectangular-like side surface 121 of the receptacle 111. These channels, in combination with aperture 139 in the printed circuit board 109, provide back pressure release for the ringer alert transducer 107.

In the preferred embodiment the microphone lead wires 141 are dressed through the second aperture 131 in the receptacle 111. The lead wires 141 enter the second aperture 131 at the square side surface 119 of the receptacle 111 and exit the second aperture 131 at the edge of the rectangular bottom surface 117 and triangular-like side surface 125 of the receptacle 111. Dressing the lead wires 141 through the second aperture 131 prevents the wires from being damaged when the radio telephone is assembled.

A platform 203 is molded as part of the rectangular bottom surface 117 of the receptacle 111. The platform 203 provides a weatherproof seal between the inside and outside of the radio telephone through battery latch apertures 205 in the rear housing 103. The battery latch design enables that apertures 205 to extend from the outside of the radio telephone through the rear housing 103 to the inside of the radio telephone. These apertures 205 could allow undesirable weather elements to enter the radio telephone. The raised platform 203 on the rectangular bottom surface 117 of the receptacle 111 is compressed against and covers the battery latch apertures 205 in the rear housing 103 once the radio telephone is assembled.

The receptacle 111 compresses into the front housing of the radio telephone 101. This is accomplished by interfacing step 207 on three surfaces of the receptacle 111 to a wall 209 molded inside the front housing 101.

The step 207 is a raised portion of the receptacle included on the triangular-like side surface 121, rectangular side surface 123 and triangular-like side surface 125 sides of the receptacle 111. The step 207 on both triangular-like side surfaces 121 and 125 slightly overhangs the square side surface 119. The step 207 on the three sides of the receptacle 111 rests on the three sided molded wall 209 in the front housing 101. The edge of the platform 203 overhangs the square side 119. The receptacle 111 is compressed along the step 207 between the wall in the front housing 209 and the printed circuit board 109. The edge of the platform 203 along the square side is compresses against the inside of the front housing 101 near bottom opening 115. This compression fit provides a redundant acoustic and weatherproof seal for the receptacle 111 to free space outside the radio telephone through the front face aperture 113 in the front housing 101.

Figure 3:
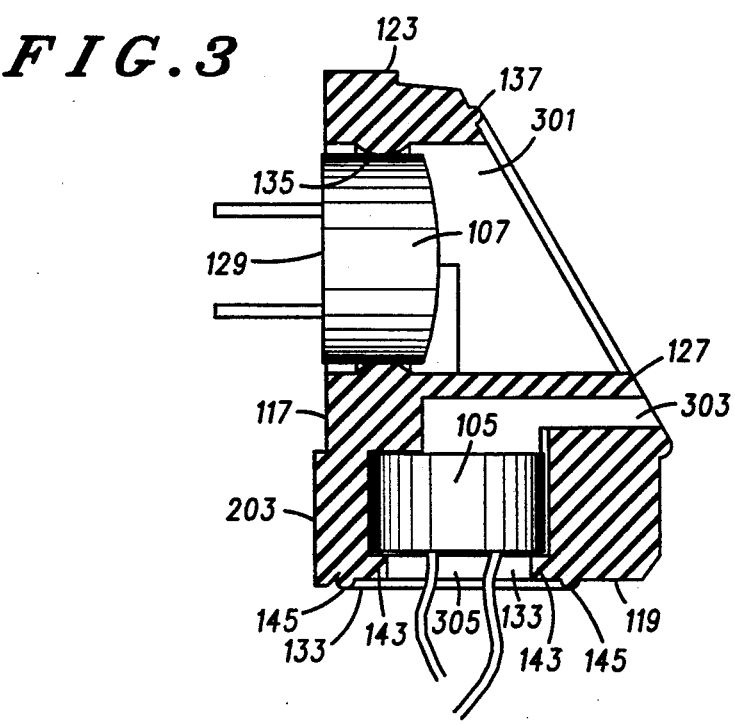
FIG. 3 is a cross section of the preferred embodiment of the present invention.

Now referring to FIG. 3 there is shown a cross section of the preferred embodiment of the present invention. The cross section shows in more detail the first, second and third gasket, 135, 137 and 145, and the first and third apertures, 129 and 133.

The first gasket 135 inside the first aperture 129 provides a seal around the ringer alert transducer 107. The resonant cavity 301 for the ringer alert transducer 107 is represented by the volume of space above the ringer alert transducer 107 within the first aperture 129.

The second gasket 137 provides an acoustic and weatherproof seal between the receptacle 111 and the front housing 101 around the housing's front face aperture 113.

The third gasket 145 provides an acoustic and weatherproof seal between the receptacle 111 and the front housing 101 around the housing's bottom face aperture 115.

The noise cancelling microphone transducer 105 is captivated within the third aperture 133 with the ledge 143. The ledge 143 provides an acoustic seal to isolate the balanced chambers 303 and 305 from each other.

Once the noise cancelling microphone transducer 105 is in place, the third aperture 133 is divided into two balanced chambers 303 and 305. The balanced chambers allow the microphone 105 to cancel out the background noise entering both chambers.

Thus, the cost, assembly and quality problems are solved by mounting both the noise cancelling microphone and the ringer alert transducer in a single flexible wedge-shaped mounting receptacle.

What is claimed is:

1. An apparatus for mounting at least a first and a second transducer in electronic equipment having a housing, the apparatus comprising:
    a flexible wedge-shaped receptacle including a first, second and third surface, said third surface disposed at an acute angle to said first surface, said second surface disposed between said first and third surfaces;
    a first aperture extending from said first surface, through said receptacle, to said third surface to hold the first transducer; and
    a second aperture extending from said second surface, through said receptacle, to said third surface to hold the second transducer.

2. An apparatus in accordance with claim 1 wherein the second transducer has lead wires attached thereto, the apparatus further comprising a third aperture extending from said first surface, through said receptacle, to said second surface through which the lead wires are dressed.

3. An apparatus in accordance with claim 1 further comprising means for sealing said first aperture around the first transducer.

4. An apparatus in accordance with claim 1 further comprising means for sealing said second aperture around the second transducer.

5. An apparatus in accordance with claim 1 further comprising means for sealing said second surface against the housing.

6. An apparatus in accordance with claim 1 further comprising means for sealing said third surface against the housing.

7. An apparatus in accordance with claim 1 further comprising at least one aperture in the housing providing an acoustic interface between the first and the second transducers inside the housing and free space outside the housing.

8. An apparatus for mounting at least a first and second transducer in electronic equipment having a housing, the apparatus comprising:
- a flexible wedge-shaped receptacle including a first, second and third surface, said third surface disposed at an acute angle to said first surface, said second surface disposed between said first and third surfaces;
- a first aperture extending from said first surface, through said receptacle, to said third surface to hold the first transducer;
- a second aperture extending from said second surface, through said receptacle, to said third surface to hold the second transducer;
- means for sealing said first aperture around the first transducer;
- means for sealing said second aperture around the second transducer;
- means for sealing said second surface against the housing; and
- means for sealing said third surface against the housing.

9. An apparatus in accordance with claim 8 wherein the second transducer has lead wires attached thereto, the apparatus further comprising a third aperture extending from said first surface, through said receptacle, to said second surface through which the lead wires are dressed.

10. An apparatus in accordance with claim 8 further comprising a platform on said first surface.

11. An apparatus in accordance with claim 8 wherein said means for sealing said first aperture around the first transducer further comprises a gasket molded as part of said wedge-shaped flexible receptacle.

* * * * *